Jan. 28, 1969  R. E. BUCK  3,424,467
CHUCK CONSTRUCTION
Filed Aug. 25, 1966  Sheet 1 of 2

INVENTOR
RUSSELL E. BUCK
BY
Woodhams, Blanchard & Flynn
ATTORNEYS

Jan. 28, 1969　　　R. E. BUCK　　　3,424,467
CHUCK CONSTRUCTION
Filed Aug. 25, 1966　　　　　　　　　　Sheet 2 of 2

INVENTOR
RUSSELL E. BUCK
BY
Woodhams Blanchard Flynn
ATTORNEYS

United States Patent Office 3,424,467
Patented Jan. 28, 1969

3,424,467
CHUCK CONSTRUCTION
Russell E. Buck, Scotts, Mich., assignor to Buck
Tool Company, Kalamazoo, Mich., a corporation
of Michigan
Filed Aug. 25, 1966, Ser. No. 575,183
U.S. Cl. 279—2            8 Claims
Int. Cl. B23b *31/40, 31/16*

ABSTRACT OF THE DISCLOSURE

A chuck construction comprising a chuck body having guideways radially disposed therein with the guideways including guide surfaces which are sloped rearwardly and outwardly. Jaw carriers are disposed in the guideways and move outwardly and rearwardly along the sloped guide surfaces in response to rearward movement of a drawbar actuated drive member reciprocally disposed in a rearwardly opening central recess in the chuck body. Jaws mounted on the jaw carriers are adapted to internally grip a hollow workpiece as the jaw carriers move outwardly and rearwardly and, in so doing, move the workpiece rearwardly into firm engagement with the forward face of the chuck body or with suitable abutment means disposed thereon.

---

This invention relates to a chuck construction and more particularly relates to a drawbar operated chuck having jaws movable outwardly along paths sloped rearwardly away from the workpiece to be held thereby and which is particularly intended for internally gripping hollow workpieces.

Prior radial jaw chucks of the drawbar operated type generally do not precisely axially locate a workpiece during chucking. More particularly, the gripping surfaces on the jaws of such conventional chucks tend to rock axially away from the body of the chuck by a small amount as the jaws are pressed radially against the workpiece as a result of normal clearances between the jaw carriers and their guideways in the chuck body. Of course, this tendency of the jaws to rock becomes more pronounced as the clearances increase due to wear. Thus, a workpiece manually positioned against the face of the chuck body prior to engagement by the jaws may be shifted axially away from the chuck body as the jaws are tightened thereon so that a cutting tool correctly located with respect to the chuck will be axially mispositioned with respect to the workpiece.

This undesirable axial shifting of the workpiece during chucking has been eliminated for externally gripped workpieces in the chuck construction disclosed in U.S. Patent No. 3,252,710 assigned to the assignee of the present invention. Since the marketing of the chuck construction of the above-mentioned patent, a demand has been noted for a chuck construction capable of overcoming the above-mentioned defect of conventional jaw chucks and particularly adapted for internally gripping a hollow workpiece.

Accordingly, it is an object of this invention to provide a chuck construction capable of urging a workpiece axially against the forward wall of the chuck body or suitable abutments thereon as it is being gripped by the chuck jaws.

A further object is to provide a chuck construction, as aforesaid, in which the jaws move rearwardly in the chuck body as they move into gripping engagement with the workpiece and in which the rearward jaw displacement exceeds any tendency of the gripping surfaces of the jaws to rock forwardly as pressure is applied thereby to the workpiece.

A further object is to provide a chuck construction, as aforesaid, which is drawbar operated in which the jaws each have a component of motion in the same direction as the movement of the drawbar axially and which provides for radially outward and rearward movement of the jaws in response to a rearward pull on the drawbar.

A further object is to provide a chuck construction, as aforesaid, in which the length of each jaw carrier supported on the chuck body is maximized, there being surfaces for slideably supporting each said jaw carrier located closely adjacent a pair of diagonally opposed corners thereof, one such guide surface being disposed on the inner end of each jaw carrier in a plane spaced from the other guide surfaces of the carrier.

A further object is to provide a chuck construction, as aforesaid, wherein the radial force upon the workpiece required to resist torque loads applied to the workpiece is reduced, thus reducing the risk of workpiece wall deflection, the radial force reduction being made possible by increased friction between the end of the workpiece and the face of the the chuck abutting same.

A further object is to provide a chuck construction, as aforesaid, which, although particularly adapted for internally gripping a hollow workpiece, may be used for externally gripping a workpiece as well.

A further object is to provide a chuck construction, as aforesaid, which utilizes a two-piece jaw carrier and in which guiding surfaces are provided on both parts thereof.

A further object is to provide a chuck construction, as aforesaid, in which the jaw carriers include surfaces adapted to abut corresponding surfaces on the chuck body for positively limiting inward movement of the jaw carriers.

A further object is to provide a chuck construction, as aforesaid, in which the jaw carriers are urged outwardly at points thereon spaced close to the guide surfaces thereon to minimize the rocking couple applied to the jaw carriers during chucking.

A further object is to provide a chuck construction, as aforesaid, which is relatively inexpensive to manufacture, which requires no operator retraining for its use, which is readily maintained and is capable of a long service life under difficult conditions with little or no maintenance.

Other objects and purposes of this invention will be apparent to persons acquainted with devices of this type upon reading the following specification and inspecting the accompanying drawings.

Figure 3:
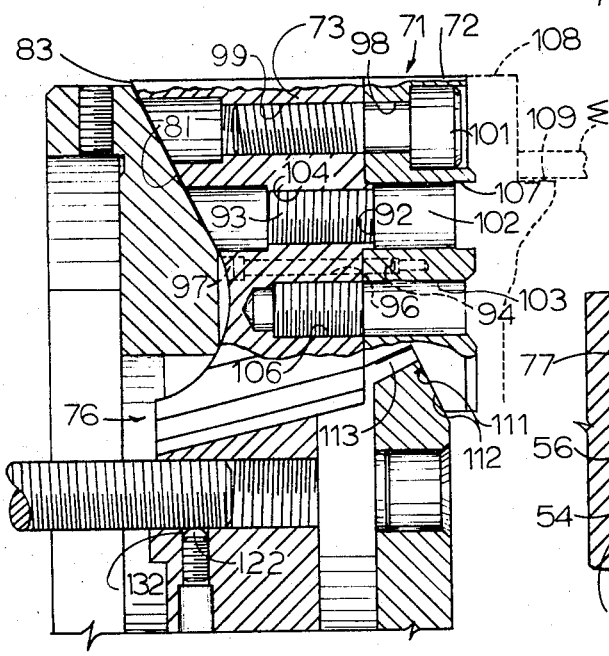
FIGURE 3 is a fragment of FIGURE 2 showing the jaw carrier in a different position of operation and with the jaw carrier partially broken away.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer to the ends of the chuck body nearest and furthest from the workpiece, i.e., facing toward the right and left, respectively, in FIGURE 3.

The words "inwardly" and "outwardly" will refer to directions toward and away from, respectively, the geometric center of the device and designated parts thereof. Said terminology will include the words above specifically mentioned, derivatives thereof and words of similar import.

GENERAL DESCRIPTION

In general, the objects and purposes of this invention are met by providing a chuck construction comprising a chuck body having stepped, interfitting front and back portions. Guideways are disposed radially in said chuck body and include guide surfaces sloped rearwardly and outwardly. Jaw carriers are disposed in the guideways and move outwardly and rearwardly along the sloped guide surfaces in response to rearward movement of a drawbar actuated drive member reciprocally disposed in a rearwardly opening central recess in the chuck body. Jaws carried by the jaw carriers are particularly adapted to internally grip a hollow workpiece and in so doing to move the workpiece rearwardly into the firm engagement with the forward face of the chuck or suitable abutment means disposed thereon.

DETAILED DESCRIPTION

Figures 1, 2:
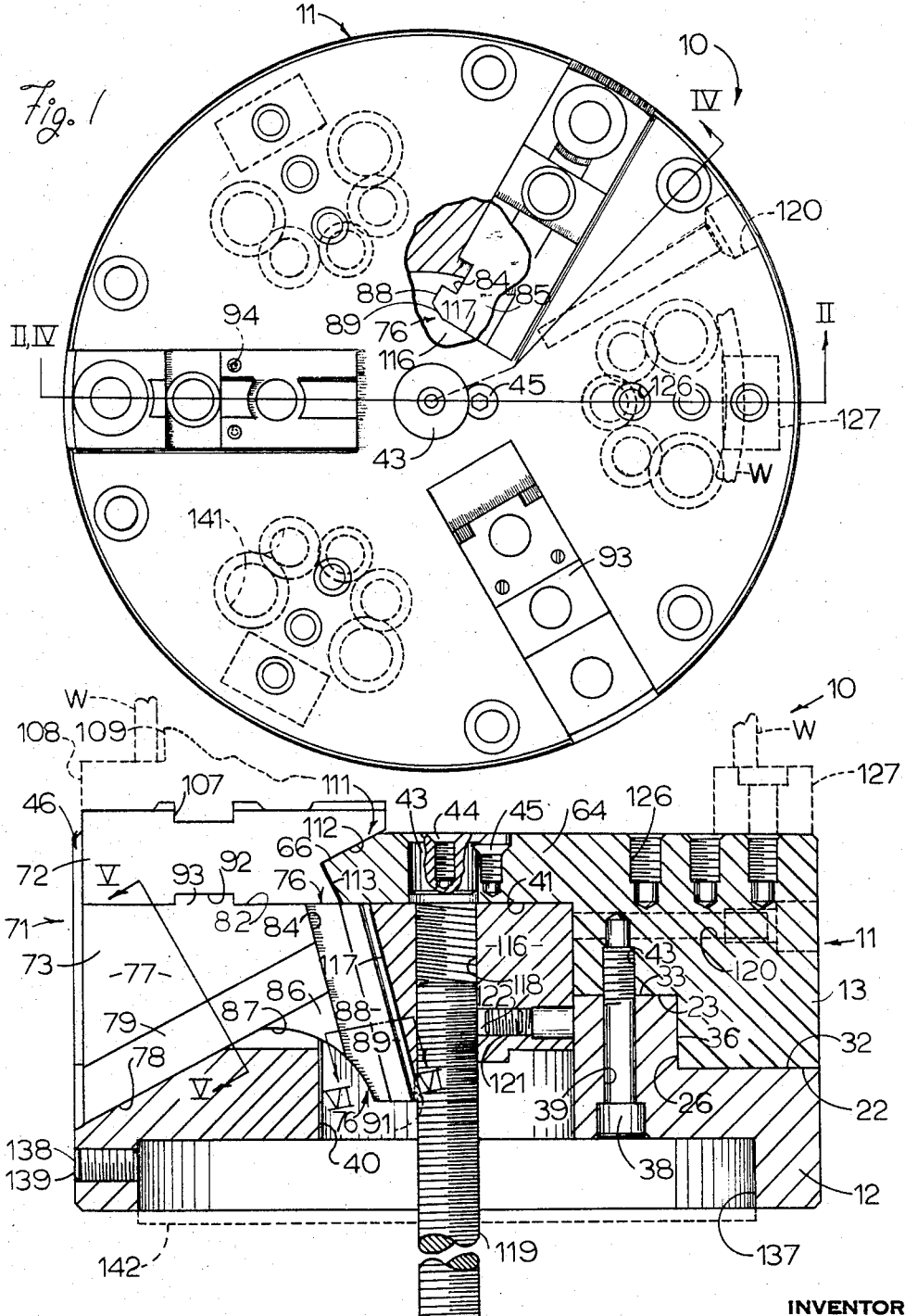
FIGURE 1 is a partially broken front elevational view of a chuck construction embodying the present invention with one jaw carrier partially broken and with the top of one of the jaw carriers removed.
FIGURE 2 is a central cross-sectional view taken on the line II—II of FIGURE 1.

Referring now to FIGURES 1 and 2, the chuck 10 embodying the invention includes a generally cylindrical chuck body 11 comprising a back plate 12 and a front plate 13. The front plate 13 and back plate 12 are generally conically related, the front plate 13 having a concave rear face for receiving the convex front face of the back plate 12 therewithin. Said front and rear faces are in the preferred embodiment shown stepped. Thus, the front plate 13 has two annular, rearwardly facing surfaces 22 and 23, the surface 22 being set outside and to the rear of the surface 23 by a cylindrical surface 26. The back plate 12 has two annular, axially displaced, forwardly facing surfaces 32 and 33 abutting the surfaces 22 and 23, respectively. The back plate 12 also has a circumferential surface 36 connecting the radial surfaces 32 and 33 and which pilots within the surface 26 in the front plate 13 to insure concentricity of the parts of the assembled chuck body 11.

An inner ring of screws 38 (FIGURE 2) extends through preferably countersunk holes 39 in the rear plate 12 and threadedly engage preferably blind holes 43 in the front plate 13. The screws 38 extend through the radial surfaces 23 and 33. Similarly, an outer ring of screws 37 extend rearwardly through the front plate 13 near the periphery thereof and threadedly engages the rear plate 12 at the radial surface 32 thereof.

Figure 5:
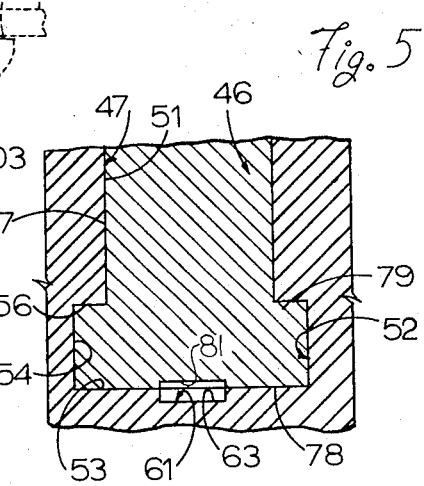
FIGURE 5 is an enlarged, fragmentary sectional view taken on the line V—V of FIGURE 2.
Figure 4:
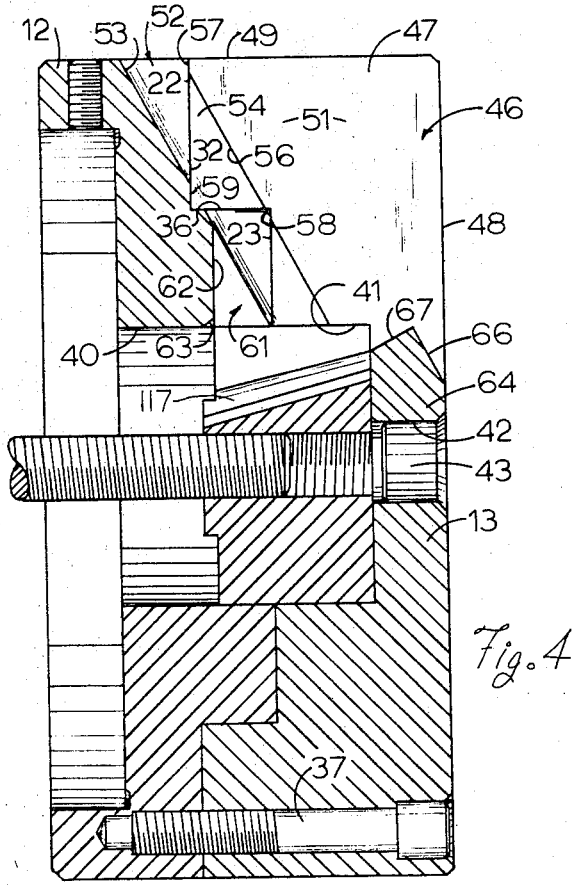
FIGURE 4 is a sectional view taken substantially on the line IV—IV of FIGURE 1 with the jaw carrier removed from the chuck body.
Figure 6:
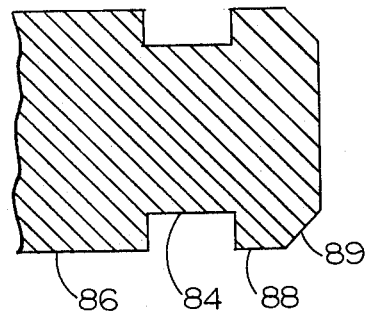
FIGURE 6 is an enlarged, fragmentary sectional view taken on the line VI—VI of FIGURE 2.

The back plate 12 has a central opening 40 (FIGURES 2 and 4) therethrough and the front plate 13 has a rearwardly opening central recess 41 therein constituting a linear extension of the central opening 40. An access hole 42 coaxial with the recess 41 communicates therefrom through the front face of the front plate 13. If desired, the opening 42 may receive a suitable expandable plug 43 having an expansion screw 44 and held against rotation by a screw 45 for protecting the inside of the chuck against dirt. The chuck body 11 includes a plurality, here three, of circumferentially spaced guideways 46 (FIGURES 4 and 5). The guideways 46 are preferably identical and a description of one will suffice for all. The guideways are of substantially T-shaped transverse cross section as generally indicated in FIGURE 5. Each guideway 46 includes a slot 47 which opens through the forward surface 48 of the front plate 13 in the portion thereof generally radially outwardly spaced from the hole 42. The slot 47 opens through the peripheral wall 49 of the chuck body between the front wall 48 and a point intermediate of the forward and rearward wall of the back plate 12. The slot 47 extends radially of the chuck body and communicates at its inner end with the recess 41. The slot 47 has opposed, parallel side walls 51 which are centered on and parallel to a plane containing the axis of the chuck body.

Each guideway 47 further includes a guide passage 52 of rectangular cross section which communicates at its forward side with the slot 47 and is preferably centered thereon. The guide passage 52 extends through the peripheral wall 49 of the chuck body and also communicates with the recess 41 in the forward plate 13. The guide passage 52 comprises a rear wall 53 and opposed parallel side walls 54. The side walls 54 of the guide passage 52 are spaced further apart than the side walls 51 of the slot 47 for forming coplanar ledge surfaces 56 on either side of the slot 47 which are in spaced, parallel and opposed relationship to the rear wall 53. The rear wall 53 and ledge surfaces 56 are sloped rearwardly and outwardly with respect to the radial forward wall 48 of the chuck body, preferably at an angle of about 30°. However, it is contemplated within the broader aspects of the invention that other angles between 0 and 45° may be employed.

The guide passage 52 extends along the join of the front and rear plates 13 and 12, respectively, the rear wall 53 thereof being in the forward face of the rear plate 12 and the ledge surfaces 56 lying in the rear face of the front plate 13. Small transverse notches 57 and 58 are formed at the outer ends and intermediate portions of the ledge surfaces 56 by the radial surfaces 22 and 23. Similarly, a small transverse notch 59 is formed intermediate the ends of the rear wall 53 at the intersection of the radial wall 32 and cylidnrical wall 36 of the rear plate 12. The transverse notches 57, 58 and 59 assist in the lubrication of the ledges 56 and the longitudinal edge portions of the wall 53.

A rectangular cross-section groove 61, having a radial rearward wall 62, is cut in the rear wall 53. The groove 61 is radially inwardly spaced from the notch 59 and communicates with the central opening 40 in the rear plate 12. The inner edge of the rearward wall 62 of the groove 61 is preferably chamfered as indicated at 63. The slot 47 is bounded at its inner end by the wall 64 closing the forward end of the recess 41. More particularly, a sloped, planar and forwardly facing guide surface 66 is cut in the forward wall 64 at the inner end of the slot 47 and parallels the rear wall 53 of the guide 46. The outer end of the guide surface 66 extends only partially through the wall 64 and a further, generally outwardly facing surface 67, here perpendicular to the guide surface 66 as well as to the side walls 51 of the slot 47, extends generally rearwardly from the guide surface 66 to the recess 41.

A jaw carrier 71 (FIGURES 2, 3 and 5) is slideably disposed in each of the guideways 46. Although it is contemplated that the jaw carrier 71 may be made of a single piece, it is preferably of two-piece construction having a front portion 72 and rear portion 73. The rearward portion 73 includes a key 76 hereinafter described as its inner end. The rear portion 73, except for the key 76, is of generally T-shaped cross section and corresponds in shape to the guideway 46 in which it is slideably disposed. More particularly, the rear portion 73 includes spaced parallel side walls 77 adapted to snugly but slideably engage the side walls 51 of the slot 47. The rearward wall 78 of the rear carrier portion 73 is essentially planar and is adapted to snugly but slideably engage the rear wall 53 of the guideway 46. The rear carrier portion 73 is widened adjacent the rear wall 78 thereof to form outwardly extending guide rails 79 of rectangular cross section which extend along the length of the rear wall 78. The guide rails 79 are adapted to snugly but slideably engage the side walls 54 and ledge surfaces 56 of the guideway 46. Thus, the rearward carrier portion 73 is supported by the guideway 46 for movement therealong, i.e., along a rearwardly and outwardly sloped path. A shallow rectangular lubrication groove 81 extends longitudinally of the rear wall 78 of the carrier portion 73. The groove 81 crosses the notch 59 and communicates through the groove 61 with the central opening 40 of the chuck body.

The key 76 (FIGURES 1 and 2) which is integral with the inner end of the rear carrier portion 73, is generally T-shaped in cross section as indicated in FIGURE 1. The key 76 extends from the front wall 82 of the rear carrier portion 73 past the guide rails 79 and nearly as far rearwardly as the rear edge 83 of the rear wall 78. Rectangular cross-section grooves 84 in the opposite sides of the rear carrier portion 73 define the narrowed neck 85 of the key 76. The major portion of the key 76 is disposed rearwardly of the inner ends of the guide rails. A web 86, defined by a rearward extension of the side walls 77 past the guide rails 79, braces the rearward end of the key 76 with respect to the rear wall 78 of the rear carrier portion 73. The web 86 has a concave rear face 87 which is faired into the wall 78 and continues into the rearward end of the key 76, trimming the rearward and outward corner thereof. In the particular embodiment shown, the side walls 88 of the key 76 are more closely spaced than the side walls 77. The inner corners of the key 76 are chamfered as indicated at 89, the chamfer surfaces 89 running the length of the key 76. The key 76 is inclined at a small, forwardly opening angle to the axis of the chuck, this angle in the preferred embodiment shown being about 14°. The rearward end of the key 76 is grooved as indicated at 91 on the inner face of the rearward end thereof for reasons appearing hereinafter. The front face of the key 76 is adapted to abut the front wall of the recess 41 when the jaw carrier is in its innermost position shown in FIGURE 2. The concavity of the rear face 87 of the web 86 and the chamfer 63 on the rear plate 12 determines the extent to which the carrier 71 may be moved outwardly along the guideway 46.

The rearward face of the front carrier portion 72 is provided with a transverse rectangular groove 92 (FIGURES 1 and 2) intermediate its ends in which is snugly receivable an upstanding projection 93 on the forward face of the rear carrier portion 73. A transversely spaced pair of blind and relatively small diameter threaded openings 94 (FIGURES 1 and 3) extend forwardly into the front carrier portion 72 and are coaxially aligned with counterbored openings 96 extending forwardly through the rear carrier portion 73. Suitable screws 97 are received in the openings 96 and threadedly engage the carrier openings 94 for holding the inner ends of the carrier portions 72 and 73 together. Larger diameter, coaxial openings 98 and 99, the latter being threaded, extend through the carrier portions 72 and 73, respectively, near the radially outer ends thereof. A screw 101 is received in the openings 98 and 99 to hold the outer ends of the carrier portions 72 and 73 together. Further axial openings 102 and 103 are spaced inwardly from the opening 98 and extend through the front carrier portion 72. The opening 102 is preferably centered on the groove 92. Further threaded openings 104 and 106 extend rearwardly into the rear carrier portion 73 in coaxial alignment with the openings 102 and 103, respectively. The opening 104 is preferably a through opening. Openings 99 and 104 are counterbored at their rearward ends.

The front face of the front carrier portion 72 is provided with a transverse rectangular groove 107 for locating a suitable jaw indicated in broken lines at 108. The jaw 108 may be held by suitable screws, not shown, insertable through one or the other of the openings 102 and 103 in the threaded engagement with the openings 104 and 106 for holding the jaw in position on the jaw carrier 71. Alternately, it is contemplated that an elongated screw may be substituted for the screw 101 whereby to hold the jaw 108 on the carrier by threaded engagement with the opening 99. As a still further alternative, undersized screws may be inserted into the counterbored rearward ends of one or the other of the openings 99 and 104 for threadedly engaging the jaw 108 and assisting in holding the forward portion 72 of the carrier in position on the rearward carrier portion 73.

The inner end of the forward carrier portion 72 is provided with a transverse notch 111 defined by forward and rearward walls 112 and 113 arranged at right angles to each other. The forward notch wall 112 is parallel to the rearward wall 78 of the rear carrier portion 73. The forward notch wall 112 snugly engages and is slideably supported with respect to the guide surface 66 on the forward wall 64 of the chuck body to assist the surfaces of the rear carrier portion 73 in guiding the jaw carrier 71. When in its innermost position, the inner end of the front carrier portion 72 preferably extends inwardly beyond the surface 66 so as to maximize the length of contact between the surfaces 66 and 112 as the carrier 71 moves outwardly.

It will be noted that if the groove 84 was continued forwardly through the front carrier portion 72, it would lie at the radially outer end of the notch 111 and would thereby tend to weaken the inner end of the front carrier portion 72 at its area 112 of sliding support on the chuck body. The carrier 71 is thus made in two parts to avoid extending the groove 84 into proximity with the notch 111.

A cylindrical drive member 116 (FIGURES 1 and 2) is snugly but axially slideably disposed in the recess 41 and the coaxial opening 40. The drive member 116 is provided with key slots 117 which open through peripheral and end walls thereof. The key slots 117 are circumferentially spaced to oppose corresponding ones of the keys 76. The keys 76 are snugly but slideably disposed within the key slots 117 and correspond closely in cross section thereto. Thus, the longitudinal extent of the key slots 117 are angled to the axis of the chuck at the same inclination as the keys 76. The key slots 117 are positioned radially of the drive member 116 so that the drive member will abut the forward wall 64 when the forward ends of the keys 76 abut such forward wall. The axial length of the drive member 116 is here less than that of the keys 76 so that the rearward ends of the keys extend therebeyond when the drive member is forward, the drive member 116 extending about to the rearward end of the keys when in its rearwardmost position. Rearward movement of the drive member 116 wedges the carriers 71 outwardly whereas forward movement of the drive member 116 pulls the carriers 71 inwardly.

The drive member 116 is provided with a central threaded opening 118 therethrough for receiving the forward end of a threaded drawbar 119 coaxial of the chuck body which may be energized by any convenient reciprocating drive on the lathe, not shown, to which the chuck is attached. The grooved portion 91 at the inner end of the key 76 is provided to clear the periphery of the screw 119. The screw 119 is held firmly in a fixed axial position of adjustment by a set screw 121 radially threaded through the drive member 116 as indicated in FIGURE 2, a resilient cushion 122 preferably being provided between the inner end of the set screw and the drawbar to prevent damage to the drawbar threads while holding the drawbar in a fixed circumferential position with respect to the drive member.

A lubrication passage 120 extends radially inwardly from the periphery of the chuck body to the recess 41 for lubricating the moving parts of the chuck.

Any convenient means may be employed for mounting the chuck 10 on a lathe (not shown). In this embodiment, the chuck body 11 has a relatively shallow, rearwardly opening, cylindrical recess 137 (FIGURE 4) in the back plate 12 with a plurality of radial, threaded openings 138 communicating between said recess 137 and the outer circumferential face of said back plate 12. Adjusting screws 139 threadedly engage the threaded openings 138. A plurality of spaced, preferably countersunk holes 141 indicated in broken lines in FIGURE 1 pass through the back plate 12, through the stepped surfaces 22 and 23 and into the recess 137 for receiving screws (not shown) to hold same to the face plate, indicated in broken lines at 142, of a lathe. United States Patent No. 2,639,157 discloses means for mounting a chuck on a lathe including the above-mentioned characteristics and such means need no further discussion here.

A plurality, here three, of radially distributed, axial threaded holes 126 (FIGURES 1 and 2) is provided in the forward wall of the chuck body between each pair of jaw carriers. Abutment blocks indicated in broken lines at 127 of any convenient type may be fixed to the forward wall of the chuck body by screws (not shown) engaging the holes 126 to provide an axial stop for the rearward end of a workpiece W internally gripped at 109 by the jaws 108.

OPERATION

Although the operation of the chuck 10 embodying the invention has been indicated somewhat above, same will be discussed in detail hereinbelow to assure a more complete understanding of the invention. With the chuck 10 mounted on the face plate 142 or by any other convenient means on a lathe and the drawbar 119 of the chuck secured to suitable reciprocable energizing means on the lathe by any convenient means, the axial position of the drawbar 119 in the drive member 116 may be adjusted by relative rotation therebetween, the set screw 121 being loosened to allow such adjustment. With suitable jaws 108 fixed on the jaw carriers 71 as above described, a hollow workpiece W may be moved coaxially toward the forward end of the chuck and telescoped over the outwardly facing workpiece gripping surfaces 109 of the jaws. With the workpiece manually held against or near the forward faces of the abutments 127, the drawbar 119 is pulled rearwardly thus moving the drive member 116 rearwardly therewith. The drive member 116, through contact with the keys 76, thus urges the jaw carriers outwardly. The guideways 46 cause the jaw carriers 71 to move rearwardly as they move outwardly. Thus, as the face 109 of the jaw moves outwardly into contact with the workpiece W, it also tends to move the workpiece W rearwardly therewith thereby urging same forcibly against the abutments 127. Precise axial positioning of the workpiece W, when chucked, is thus positively assured. Since the workpiece W when chucked is held firmly against the abutments 127, friction at the inner face therebetween is increased and results in increased resistance to relative rotation between the workpiece and the chuck. The workpiece W may be released by forward movement of the drawbar 119 which draws the jaw carriers 71 and jaws 108 inwardly away from the walls of the workpiece W.

When the work-engaging surface 109 of the jaw 108 moves into contact with the internal wall of the workpiece W, a clockwise (FIGURE 2) couple is exerted on the jaw carrier 71. This couple is resisted by the engagement of the guide rails 79 and the rearwardly facing surface 112 on the carrier 71 with the corresponding surfaces 56 and 66 of the chuck body. The points of support on the jaw carrier furthest from its center of rotation provide the greatest leverage for resisting the rotative couple, these points being the outer ends of the guide rails 79 and the radially inner end of the surface 112 on the forward carrier portion 72. These points are essentially at opposite diagonal corners of the jaw carrier construction and thus are essentially the furthest separated points on the side of the jaw carrier so as to provide a maximum resistance to the rocking couple.

Moreover, it will be noted that the clockwise rocking couple exerted on the carrier 71 during outward movement thereof, tends to maximize the pressure between the outwardly facing surfaces of the key slot 117 and the inwardly facing surfaces of the key 76 at the forward end of the key and the drive member and minimize the pressure on these surfaces at the rear end of the key and drive member. However, the forward tip of the key 76 lies between the planes of the forward guide rail surfaces and surface 112 and close to a line connecting the points of maximum rocking couple resistance, i.e., the outer ends of the guide rails 79 and the radially inner end of the front carrier portion 72. Further, a normal force exerted on the radially inner face of the key at its forward end would be directed centrally of the jaw carrier thus minimizing the component thereof directed tangentially of rocking movement. The extended rear end of the key 76 would also generally tend to resist a clockwise torque on the carrier 71. Thus, the contribution of the outward force on the jaw carrier to the clockwise rocking couple would appear small.

The substantial length of the key 76 provides a relatively large area for contact by the key slot to minimize unit pressure loading thereon during chucking of the workpiece so as to minimize friction and wear therebetween. During chucking of a workpiece, the jaw carriers move rearwardly with the drawbar 119 and drive member 116 as well as outwardly thus tending to reduce frictional losses in the sliding engagement of the key 76 and the key slot 117.

Although the chuck 10 may be adapted to grip externally held workpieces by substitution of jaws having inwardly facing gripping surfaces for the jaws 108, it will be apparent that the drawbar 119 will undergo compressive stress during chucking of such an externally held workpiece and that the externally held workpiece W will not be drawn tightly against the abutment means 127 during chucking.

Although a particular preferred embodiment of the invention has been disclosed hereinabove for purposes of illustration, variations or modifications of such disclosure lying within the scope of the appended claims are fully contemplated.

The embodiments of the invention in which an exclusive property or privilege is claimed are defined as follows:

1. A jaw chuck construction for internally gripping a hollow workpiece, the combination comprising:
    a generally cylindrical radially extended chuck body having a peripheral wall and a forward wall means, the chuck body further having a central recess formed therein and opening rearwardly of said chuck body;
    three circumferentially spaced guideways formed in said chuck body and extending from said recess radially outwardly through said peripheral wall, said guideways also opening through said forward wall means, said guideways including guide surfaces formed on said chuck body and extending outwardly and rearwardly at an angle of no more than 45 degrees relative to a plane transverse to the axis of said cylindrical chuck body;
    jaw means movably mounted on said chuck body for internally gripping said hollow workpiece and for moving said hollow workpiece rearwardly into firm engagement with said forward wall means, said jaw means including jaw members reciprocable in corresponding ones of said guideways and including jaws extending forwardly of said chuck body, each of said jaws having a substantially radially outwardly facing workpiece engaging surface thereon for internally gripping said hollow workpiece; and
    drive means connected to said jaw means for moving same radially outwardly and rearwardly for internally gripping said workpiece and moving same rearwardly into firm engagement with said forward wall means, said drive means including a drive member axially reciprocable in said recess and having a substantially axially extending undercut groove therein opposite each of said jaw members, said grooves converging rearwardly relative to the chuck axis, the inner end of said jaw members each including means engageable in and reciprocable along said undercut grooves so that rearward movement of said drive member causes outward movement of said jaw members along said guideways.

2. A chuck construction according to claim 1, wherein said forward wall means substantially closes the forward end of said recess, and wherein said forward wall means has bearing surfaces formed thereon corresponding to and adjacent the inner end of each of said guideways, each of said bearing surfaces defining a plane which is substantially laterally offset from a plane defining the corresponding guide surface, the inner end of each of said jaw members bearing slideably against said bearing surfaces formed on said forward wall means.

3. A chuck construction according to claim 1, wherein said guide surfaces extend outwardly and rearwardly at an angle of approximately 30 degrees relative to said transverse plane, and wherein said undercut grooves define a forward angle relative to said chuck axis of approximately 14 degrees.

4. A chuck construction according to claim 1, wherein said guideways include front and rear guide surfaces which are substantially parallel to and opposed to one another and define a slot having a substantially T-shaped cross section, each of said jaw members having a substantially T-shaped portion slideably received within said slot.

5. A chuck construction according to claim 4, wherein said jaw members each include on the inner end thereof an undercut extension converging rearwardly relative to the chuck axis at a small acute angle with said undercut extension being slideably received within a corresponding undercut groove formed in said drive member.

6. A chuck construction according to claim 5, wherein said chuck body comprises separably connected front and rear parts having stepped opposed faces, the step face of said front part being essentially concave and the step face of said rear part being essentially convex for extending into the concavity of said front part, said slot extending along the stepped boundary between said front and rear parts, the rear guide surface of said slot lying in the forward wall of the rear part and the front guide surfaces of said slot lying in the rear wall of said front part.

7. A chuck construction according to claim 1, wherein said chuck body includes axially abutting, separable front and back portions, the rear end of the front portion diminishing in cross section rearwardly and the front end of the rear portion being depressed to correspond to said rear end, said guideways in said chuck body extending along said abutting front and rear ends, at least a portion of said jaw members being sandwiched between said front and rear ends to prevent movement of said jaw members transversely of said guideways.

8. A chuck construction according to claim 1, wherein said forward wall means includes abutment means having an abutment surface thereon disposed in front of said chuck body and behind said hollow workpiece whereby said jaw means cause said workpiece to be moved into firm abutting engagement with said abutment surface as the jaws move radially outwardly and rearwardly so as to internally grip said workpiece.

References Cited

UNITED STATES PATENTS

| | | | |
|---|---|---|---|
| 2,474,771 | 6/1949 | Amstutz | 279—4 |
| 2,524,006 | 9/1950 | Capelazzi | 279—110 |
| 2,697,612 | 12/1954 | Sloan | 279—121 |
| 2,704,214 | 3/1955 | Beausoleil | 279—121 |
| 3,097,860 | 7/1963 | Feldhoff | 279—117 |

ROBERT C. RIORDON, *Primary Examiner.*

D. R. MELTON, *Assistant Examiner.*

U.S. Cl. X.R.

279—121